May 14, 1957  J. R. ALEXANDER  2,792,284
PRODUCTION OF ALKALI METAL PHOSPHATES
Filed July 17, 1953
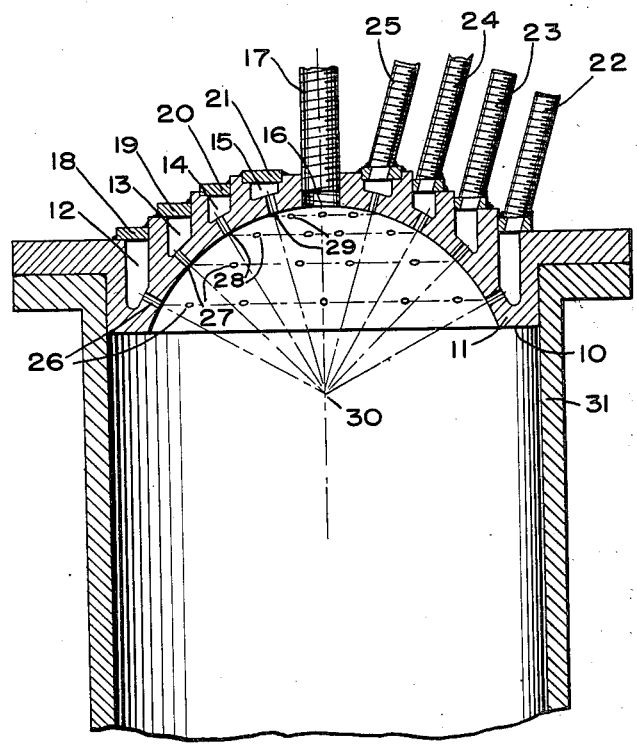
INVENTOR
JOHN R. ALEXANDER
BY
ATTORNEY

UNITED STATES PATENT OFFICE 2,792,284
Patented May 14, 1957

2,792,284

PRODUCTION OF ALKALI METAL PHOSPHATES

John R. Alexander, Kirkwood, Mo., assignor to Monsanto Chemical Company, St. Louis, Mo., a corporation of Delaware Application July 17, 1953, Serial No. 368,615

3 Claims. (Cl. 23—106)

This invention relates to a method of producing alkali metal phosphates. More particularly, this invention relates to a method of producing alkali metal phosphates by a process which utilizes an alkali metal chloride salt in a direct reaction with phosphorus or a phosphorus-containing compound.

Practically all of the commercially available sodium phosphate salts produced at the present time are manufactured from phosphoric acid and soda ash, the latter being produced from sodium chloride. In the past, many investigators have spent a great deal of time attempting to develop a process for the production of sodium phosphate salts directly from sodium chloride without first having to convert the sodium chloride to soda ash. Most of the proposed processes for the direct utilization of sodium chloride have involved the use of the sodium chloride in a liquid phase, usually as molten salt at a relatively high temperature. None of the proposed processes have met with any commercial success, primarily because of their inability to produce a product sufficiently free from contamination by unreacted sodium chloride. Other difficulties have involved finding suitable equipment to withstand the corrosive action of molten chloride and phosphate salts at the very high temperatures necessary to carry out such reactions.

It has now been found that alkali metal phosphates can be produced directly from alkali metal chlorides by a novel reaction utilizing an alkali metal chloride in the vapor phase. More specifically, it has been found that alkali metal phosphates can be produced very advantageously by the reaction of gaseous phosphorus pentoxide (or phosphorus and oxygen), gaseous alkali metal chloride and water vapor in a reaction zone maintained at a temperature above the normal boiling point of the alkali metal chloride.

By appropriate modifications of the proportions of reactants, the present invention can be utilized to produce phosphates ranging from those of relatively low alkalinity, such as the metaphosphates, to those of relatively high alkalinity, such as the pyrophosphates or orthophosphates. Because there are substantial doubts as to the actual existence, as compounds, of many of the alkali metal phosphates previously reported or suggested in the literature, and since all alkali metal phosphate compositions can be expressed in terms of a generalized formula: $(M_2O)_x(P_2O_5)_y$, wherein M is an alkali metal and wherein the ratio of $x$ to $y$ can vary continuously from 1:1 to 3:1, the use of this generalized formula will be utilized in the description of the present invention. Thus, by way of example, sodium metaphosphate ($NaPO_3$) will be expressed as $(Na_2O)(P_2O_5)$; sodium tripolyphosphate ($Na_5P_3O_{10}$) will be expressed as $(Na_2O)_5(P_2O_5)_3$; tetrasodium pyrophosphate ($Na_4P_2O_7$) will be expressed as $(Na_2O)_2(P_2O_5)$, etc.

The practice of the present invention can be better understood by reference to the drawing, which illustrates a piece of equipment which has been utilized in the practice of this invention. This equipment comprises a burner 10 having a lower concave surface 11. The upper portion of the burner contains four separated concentric annular spaces 12, 13, 14 and 15. Each of the four concentric annular spaces is covered by a flat circular ring 18, 19, 20, and 21, respectively, which is welded to the burner body to make a gas-tight closure. Each of the rings 18, 19, 20, and 21 contains an opening fitted with a pipe or similar duct 22, 23, 24, and 25 through which gases may be led into the annular spaces 12, 13, 14 and 15. Each of the annular spaces is connected to the space beneath the concave surface of the burner by a series of cylindrical openings. The longitudinal axes of all of the cylindrical openings converge at a common point 30, which is designated as the focal point of the burner. Thus, a series of cylindrical openings, two of which are indicated by the number 26, connect the annular space 12 with the space beneath the concave surface of the burner. Similarly, the series of openings designated by the numbers 27, 28 and 29 connect the annular spaces 13, 14 and 15, respectively, with the space beneath the concave surface of the burner. In the center of the burner is a tapped hole or opening 16 fitted with a pipe 17, the axis of which also passes through the focal point 30. The burner is mounted on a reaction chamber 31.

In carrying out the present invention with the above-described burner, oxygen is passed through the tube 22 into the annular space 12 and through the opening 26 to the focal point 30 of the burner. At the same time, water vapor is passed through the tube 23 into the annular space 13 and through the opening 27. Phosphorus vapors are passed through the tube 24 into the annular space 14 and through the opening 28. Additional oxygen, having suspended therein solid or molten sodium chloride, is passed through the pipe 17 and opening 16. All of the aforesaid materials converge in the vicinity of the point of focus 30 and react very rapidly and with the evolution of a considerable amount of heat and bright yellow light. The overall reaction taking place can be expressed by the following equation:

$$4yP + 5yO_2 + 2xH_2O + 4xNaCl \rightarrow$$
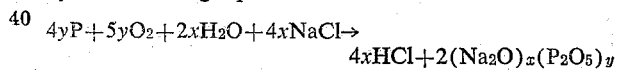
$$4xHCl + 2(Na_2O)_x(P_2O_5)_y$$

While the overall reaction takes place very rapidly, it probably involves a series of individual reactions or steps, one of which is the oxidation of phosphorus to form phosphorus pentoxide with the generation of a large amount of heat at a very high temperature. The sodium chloride is vaporized by this heat, and the sodium chloride vapor, the water vapor and the phosphorus pentoxide vapor react to form hydrogen chloride and sodium phosphate. The reaction products are then led from the chamber 31 and are very rapidly cooled or quenched to a temperature below the melting point of the sodium phosphate product. The rapid cooling or quenching can be carried out, for example, by injecting or spraying cold water into the gaseous products, or by directing the gaseous products onto a cold metal surface such as a chilled plate or rotating metal drum. In the latter cases the solid sodium phosphate product will be deposited upon the metal surface and can be continuously scraped therefrom by a mechanical scraping or abrading action.

While the foregoing description has been given in terms of the specific alkali metal, sodium chloride, it should be understood that the invention is equally applicable to the use of the other alkali metal chlorides, such as potassium and lithium chlorides, to form the corresponding potassium and lithium phosphates. Likewise, it should be apparent that many alternatives or variations of the above-described procedure and equipment can be readily utilized in the practice of the present invention. For example, under some conditions it may be desirable, or even necessary, to operate at a higher temperature than is easily obtainable by the reaction of phosphorus, oxygen, water and sodium chloride. In such a case, some or all of the water may be supplied by introducing an appropriate amount of a hydrogen-containing auxiliary fuel, e. g., molecular hydrogen, methane, natural gas, etc., along with sufficient additional oxygen to form the water as a part of the overall reaction, and at the same time utilize the heat of combustion of the fuel. It is for a purpose such as this (utilization of auxiliary fuel) that the fourth annular space has been provided in the above-described burner assembly.

When a substantial amount of heat is being supplied by the combustion of an auxiliary fuel, as suggested above, some or all of the phosphorus can be introduced as phosphorus pentoxide rather than as elemental phosphorus. As another alternative, some or all of the heat necessary to maintain the reaction at the necessarily high temperature can be supplied from an external source, such as, for example, by passing the reactants through an electric arc.

Regardless of the source from which the heat is obtained, the temperature of the reaction must be maintained above the normal boiling point of the alkali metal chloride reactant. This is necessary because it is essential that the alkali metal chloride be entirely in the vapor state before the reaction can be completed. While the alkali metal chloride can be vaporized prior to introduction into the burner, the temperature and type of equipment necessary to carry out such a vaporization are such as to make this practice relatively unattractive. Consequently, it is much preferred to introduce the alkali metal chloride as a liquid or solid suspended in one of the gaseous reactant streams. In this way the heat of reaction is utilized to vaporize the alkali metal chloride. It should be pointed out that when the alkali metal chloride is introduced to the reaction mass in a condensed state, the reaction gases must be maintained at the elevated temperature (above the boiling point of the metal chloride) for a sufficient length of time to insure complete vaporization and reaction of the alkali metal chloride. Consequently, the rapid cooling of the reaction product should not be initiated too quickly.

Since a large amount of heat will be lost by radiation from the flame to the sides of the reaction chamber 31, it may sometimes be necessary or advisable (in order to maintain the reaction temperature high enough and for a sufficient length of time) to line the reaction chamber with a refractory insulating material. On the other hand, if the reaction temperature becomes too high, as it might in the case of utilization of previously vaporized alkali metal chloride, elemental phosphorus vapor, hydrogen, and oxygen, it may be necessary to jacket the reaction chamber 31 with a liquid coolant in order to keep the walls of the chamber from melting.

The temperature of the reaction flame will materially affect the degree of contamination of final phosphate product with alkali metal chloride—the contamination increasing as the reaction temperature is decreased. The particular temperature chosen will depend upon economic factors such as materials of construction, required purity of phosphate product, etc., but will preferably be not substantially lower than the boiling point of the phosphate product for the production of high purity product. However, where chloride contamination is not an important factor, the reaction can be very readily carried out at lower temperature (though not below the boiling point of the alkali metal chloride reactant).

The rate of cooling of the reaction products is another factor which will affect the degree of chloride contamination of the final product. The thermodynamic equilibrium constant of the reaction:

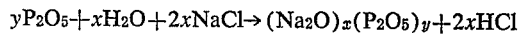

is such that at temperatures above the normal boiling points of all of the reactants and products, the reaction goes to substantial completion in the direction indicated by the equation. As the temperature is lowered, the equilibrium constant becomes smaller and the reaction tends to reverse, i. e., there is a tendency for the phosphate and hydrogen chloride to react to form sodium chloride, water, and phosphorus pentoxide. The tendency of the reaction to reverse becomes particularly marked as the temperature is lowered to below the boiling point of the sodium chloride. When the temperature is lowered further, to below the melting point of phosphate product, the equilibrium constant is even more unfavorable. However, at lower temperatures, at which the phosphate becomes a solid, the mobility of the phosphate becomes rather small and the rate of the reaction becomes quite negligible, so that there is substantially no further reverse reaction below the melting point of the phosphate product.

From the foregoing considerations, it can be seen that at the very high temperatures there is little reverse reaction because the thermodynamic equilibrium constant is the controlling factor, and that at very low temperatures there is little reverse reaction because the reaction rate is the controlling factor. Thus, in order to minimize sodium chloride contamination of the final product, it is necessary to cool the products from the higher temperature range (above the normal boiling point of alkali metal chloride, and preferably at or slightly below the normal boiling point of alkali metal phosphate product) to the lower temperature range (below the melting point of the alkali metal phosphate, and preferably below the melting points of both the alkali metal phosphate and the alkali metal chloride) as rapidly as possible or feasible. Stated another way, the gaseous products should not be kept in the intermediate temperature range any longer than necessary, since it is in this intermediate temperature range that the bulk of chloride contaminants in the final product will be formed.

It is, therefore, the aim of the rapid cooling process to cause the chemical reaction to depart as far as is practical from equilibrium conditions. Thus, in the technical sense that any process carried out under non-equilibrium conditions is said to be a thermodynamically irreversible process, the present cooling process can be characterized as one carried out under conditions of substantial chemical thermodynamic irreversibility.

The proportions of the various reactants utilized in the present invention can be varied considerably, depending upon the choice of particular reactants, the reaction conditions employed, and the degree of alkalinity desired in the final phosphate product. In general, the proportion of alkali metal chloride will be such as to introduce to the reaction between 1 and 3 atomic proportions of alkali metal for each atomic proportion of phosphorus introduced. The exact proportion will be determined primarily by the desired ratio of alkali metal to phosphorus in the final phosphate product. The minimum amount of water introduced to the reaction (including any water introduced by combustion of hydrogen or natural gas with oxygen) will be equal to one-half of a molecular proportion for each molecular proportion of alkali metal chloride introduced. In general, a considerable excess of water will be used, which excess may run as high as 100 to 150 percent above the minimum, but will preferably be maintained between about 10 and about 75 percent above the minimum. The amount of oxygen utilized (which may be introduced as pure oxygen, as air, or as oxygen-enriched air) will generally be the minimum stoichiometric amount based upon the formation of phosphorus pentoxide with all elemental phosphorus supplied and upon the formation of water with all of the molecular hydrogen supplied. While a very slight excess of oxygen will not be particularly deleterious, this excess should be maintained below a maximum of 10 percent.

The following example is illustrative of the process of the present invention.

Example

Gaseous elemental phosphorus (obtained by vaporizing yellow phosphorus above 280° C.) was continuously passed into a burner such as illustrated in the drawing and burned with a stoichiometric amount (based upon the formation of phosphorus pentoxide) of pure oxygen. Finely divided solid sodium chloride was conveyed into the flame along with the oxygen. Steam at about 100° C. was also continuously passed through the burner and into the flame in an amount about 50 percent in excess of the stoichiometric amount. The sodium phosphate product was very quickly cooled and withdrawn from the gaseous product by inserting a piece of cold copper tubing into the gas stream about 5 inches from the combustion zone. The sodium phosphate product, which was deposited upon the copper tube, corresponded approximately to the formula: $(Na_2O)_{1.55}(P_2O_5)$.

I claim:

1. A method for the production of alkali metal phosphate which comprises reacting gaseous phosphorus pentoxide, gaseous alkali metal chloride and water vapor in a reaction zone maintained at a temperature above the normal boiling point of said alkali metal chloride to form a reaction mixture containing an alkali metal phosphate and hydrogen chloride, and thereafter rapidly cooling said reaction mixture under conditions of substantial chemical thermodynamic irreversibility to a temperature below the melting point of said alkali metal phosphate.

2. A method for the production of alkali metal phosphates which comprises reacting phosphorus vapor, hydrogen, oxygen and sodium chloride vapor in a reaction zone maintained at a temperature above the boiling point of sodium chloride to form a reaction mixture containing a sodium phosphate and hydrogen chloride, and thereafter rapidly cooling said reaction mixture under conditions of substantial chemical thermodynamic irreversibility to a temperature below the melting point of said sodium phosphate.

3. A method for the production of a sodium phosphate which comprises continuously burning phosphorus with at least 1.25 molecular proportions of oxygen per atomic proportion of phosphorus to form an incandescent gaseous mass, continuously adding condensed sodium chloride to said gaseous mass at a rate such that between one and three atomic proportions of sodium is added for each atomic proportion of phosphorus burned, continuously adding water vapor to said gaseous mass at a rate such that at least one molecular proportion of water is added for each two molecular portions of sodium chloride added, to form a reaction mixture containing a gaseous sodium phosphate, gaseous hydrogen chloride and unreacted reactants, maintaining said reaction mixture at a temperature not substantially below the normal boiling point of said sodium phosphate until all of said condensed sodium chloride has been vaporized, and thereafter rapidly cooling said reaction mixture under conditions of substantial chemical thermodynamic irreversibility to a temperature below the melting point of said sodium phosphate to condense solid sodium phosphate substantially free from sodium chloride.

References Cited in the file of this patent
UNITED STATES PATENTS

| | | |
|---|---|---|
| 2,142,943 | Kerschbaum | Jan. 3, 1939 |
| 2,142,944 | Kerschbaum | Jan. 3, 1939 |
| 2,266,328 | McCullough | Dec. 16, 1941 |